Patented Sept. 11, 1928.

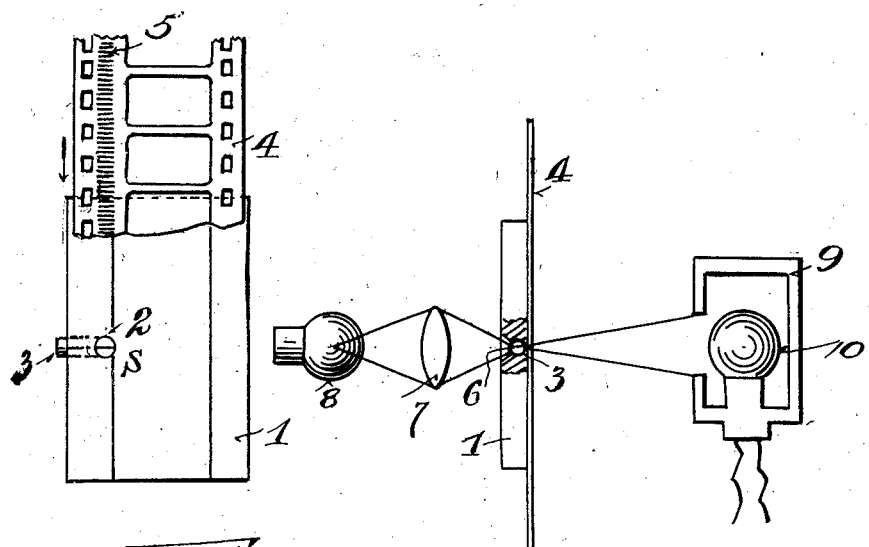
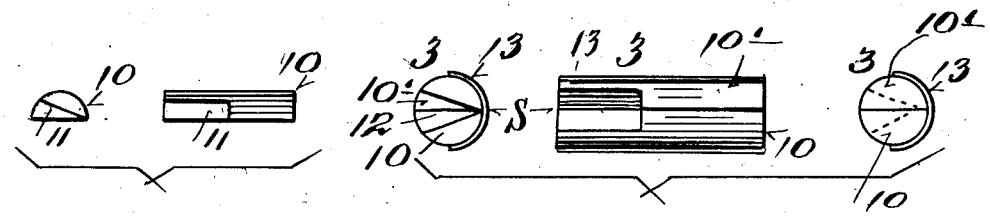

1,683,621

UNITED STATES PATENT OFFICE.

JOHN KAUFMANN, OF NEW YORK, N. Y., ASSIGNOR TO DE FOREST PHONOFILM CORPORATION, OF NEW YORK, N. Y., A CORPORATION OF DELAWARE.

FINE-SLIT CONSTRUCTION.

Application filed November 27, 1926. Serial No. 151,042.

This invention relates broadly to a slit forming means for talking motion picture apparatus.

One of the objects of this invention is the provision of a novel form of slit forming means for talking motion picture machines, by means of which exceedingly fine slits may be formed.

A still further object of this invention is to construct a slit forming arrangement of the type mentioned above, which has a protecting covering for preventing the accumulation of dust, etc. in the slit.

A further object of this invention is the construction of a slit forming member of two component parts arranged with respect to each other to provide a very fine, elongated opening.

A still further object of this invention is to provide a protecting coating for such a slit.

Another object of this invention is the combination of such a slit forming unit with a film gate.

These and many other objects are sought by the construction to be disclosed in the following specification.

This invention resides substantially in the combination, construction, arrangement and relative location of parts, as will appear more fully hereinafter.

Referring to the drawings, Fig. 1 is a front elevation view of a film gate, including my novel slit forming means, showing the position of the film with respect thereto.

Fig. 2 is a side elevation view of this construction, showing the film gate broken away to disclose the method of mounting the slit forming means.

Fig. 3 represents an end and side elevational view of one of the elements forming my slit construction, and Fig. 4 represents a side elevational view and the two end views of a complete slit forming device showing the protecting covering for the slit.

It is important, for correct reproduction of sound from a photographic record as shown in this disclosure, that the light from a fixed source be focused upon and pass through a very narrow, elongated aperture or slit, and that this slit be located as close as possible to the surface of the film carrying the photographic record. The aperture or slit should not be more than 0.001 inch in width, and must be so constructed as to permit the greatest possible amount of light to pass through it. At the same time, in order to prevent the clogging of the slit with dust and other foreign materials which would quickly clog it, a protecting covering of some transparent substance must be provided. By means of my invention, which I will now describe, I have been able to provide a device for forming a very fine slit which is also provided with a protecting covering.

To better understand Figs. 1 and 2, I will refer first to Figs. 3 and 4, wherein I have shown the construction of the slit forming unit. In Fig. 3 is shown one of the two units comprising the slit forming unit 3, which consists of a piece of half round steel which has been notched by grinding or sawing it at its end, on a line at an angle to the flat side of the piece. The notch is indicated at 11. There are two of these members, 10 and 10', which are united on the flat sides, as is shown in Fig. 4, to provide a V-shaped recess at one end, having the inclined sides 12. The two members 10 and 10' may be made from half round stock, or by sawing a short piece of small rod longitudinally in half. The angle which the sides of the notch form with the flat side of the two pieces 10 and 10', determines the width of the slot, and by carefully grinding or filing these inclined surfaces, it is possible to produce a very fine slit when the two pieces are united. In actual devices, I prefer to construct the slit forming member of a piece of stock about ⅛th of an inch in diameter, and not over ⅜ths of a inch long. When the two halves are assembled in juxtaposition, as shown in Fig. 4, and the two oblique jaws are properly cut, they do not come quite together at the apex of the inclined surfaces, but leave a fine opening S, which is in the order of 1/1000th of an inch wide, and ⅛th of an inch long. It will, of course, be evident that these dimensions have all been given in an illustrative sense, and that they may assume any desirable proportions without departing from this invention.

I have shown at 13, a protecting covering for the slit S, which may be a very thin piece of clear mica, or preferably transparent gelatine paper of sufficient width to wrap about half way around the pin assemblage.

Referring to Figs. 1 and 2, the film gate is shown at 1, and has extending inwardly from its edge a small hole slightly larger in diameter than the pin 3. Extending at right angles thereto and intersecting this hole is another hole 2, which extends completely through the film gate, and is counterbored as shown at 6, to provide an enlarged aperture for the impinging light rays. The pin with a protecting coating is inserted into the first hole, with the apex of the notch pointing towards the outer face of the gate over which the film 4 passes, so that the slit is mounted very close to the film with the protecting coating 13 between the two. In Fig. 2 I have shown a light source at 8, arranged in back of a condensing lens 7, which focuses the rays on the fine slit. The light then passes through the sound record 5, on the film 4, and thence to a light sensitive cell 10 mounted within the dark chamber 9. It will be noted in Fig. 1, that the film record 5 is arranged so that it will pass directly in front of the hole 2 and in alignment with the slit S.

In assembling the two semi-cylinder pieces 10, I may under certain conditions insert a thin piece of mica or other suitable material, preferably 1/1000 inch thick or the thickness desired for the slit itself, between these two semi-cylindrical pieces extending up to the end of, but not protruding into, the slit itself. When these three pieces are thus assembled, two semi-cylindrical pieces of steel and mica in between, I cover over the round end with solder which serves to hold the assemblage together. The assemblage is then thrust into the hole 6, Fig. 2, after the thin piece of transparent gelatine paper has been first inserted therein.

The pin 3, by reason of the hole which extends in from the edge of the film gate being close to the outer surface of the gate, will be very close to the film. To bring the film even nearer to the slit, I grind down or lap the surface of the film gate, until a very thin sheet (preferably less than 0.0005") remains between the slit and the film. The film gate is preferably made of metal. In this way I insure that the photographic record passes in front of the slit less than 0.001" therefrom.

It will be evident from this construction that I provide a new and novel form of device by means of which a very fine slit is secured with a protecting coating to prevent it from being clogged. By mounting the whole device within a recess in the film gate, and leaving a very thin sheet of the film gate between the protecting coating and the moving film, abrasion of the protecting film is prevented, since the film does not contact therewith. It will be evident then, that this construction provides a slit of suitable characteristics for talking motion picture apparatus, which permits a maximum amount of light to be transmitted therethrough without the danger of the slit being clogged with dust and dirt.

I am well aware that many changes in the details of construction and relative arrangement of parts will readily suggest themselves to those skilled in the art, and I do not, therefore, desire to be limited to the exact construction disclosed by me, but rather to the principle and scope of my invention as I define it in the appended claims.

What I seek to secure by United States Letters Patent is:—

1. In a film gate the combination with the gate member of a slit forming member on said gate member comprising two semi-circular notched members united to form a fine slit.

2. In a film gate the combination with the gate member of a slit forming member on said gate member comprising two notched members united to form a fine slit, and a thin, transparent gelatine paper covering for said slit.

3. A slit forming unit comprising two semi-circular notched members united to form a fine slit with the plane of said notches forming an acute angle with each other having the slit at the apex of the angle.

4. A slit forming unit comprising two half round members notched at the end, and juxta-opposed to form a fine slit.

5. A slit forming unit comprising two half round members notched at the end, and juxta-opposed to form a fine slit, and a protective covering for the slit.

6. A slit forming unit comprising two half round pieces each notched at one end at an angle to their flat sides, and united flat side to flat side to form a fine slit.

7. A slit forming unit comprising two half round pieces each notched at one end at an angle to their flat sides and united flat side to flat side to form a fine slit, and a gelatinous protective coating for said slit.

8. In a film gate for talking motion picture machines, the combination with a member having a transversely extending hole in the edge thereof, and a second hole extending at right angles to said hole and intersecting it, of a slit forming unit comprising two notched members mounted in said first hole to form a fine slit.

9. In a film gate for talking motion picture machines, the combination with a member having a transversely extending hole in the edge thereof, and a second hole extending at right angles to said hole and intersecting it, of a slit forming unit comprising two notched members mounted in said first hole to form a fine slit, and a thin, transparent paper protecting member covering said slit.

In testimony whereof I have hereunto set my hand on this 17th day of November, A. D. 1926.

JOHN KAUFMANN.